United States Patent
Villaire et al.

(12)

(10) Patent No.: US 10,253,733 B2
(45) Date of Patent: Apr. 9, 2019

(54) FUEL COOLING SYSTEM

(71) Applicant: GM GLOBAL TECHNOLOGY OPERATIONS LLC, Detroit, MI (US)

(72) Inventors: William L. Villaire, Clarkston, MI (US); Edward J. Strzelecki, Oxford, MI (US); Manoj R. Chaudhari, Clinton Township, MI (US); Peter Hubl, Clarkston, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 63 days.

(21) Appl. No.: 15/244,012

(22) Filed: Aug. 23, 2016

(65) Prior Publication Data
US 2018/0058394 A1    Mar. 1, 2018

(51) Int. Cl.
*F02M 31/20*    (2006.01)
*F02M 37/00*    (2006.01)

(52) U.S. Cl.
CPC ........ *F02M 31/20* (2013.01); *F02M 37/0052* (2013.01); *Y02T 10/126* (2013.01)

(58) Field of Classification Search
CPC ........................... F02M 31/20; F02M 37/0052
See application file for complete search history.

(56) References Cited

U.S. PATENT DOCUMENTS

| | | | | |
|---|---|---|---|---|
| 4,450,820 A | * | 5/1984 | Haynes | F02D 33/006 123/514 |
| 5,533,486 A | * | 7/1996 | Qutub | F02D 33/006 123/514 |
| 6,868,830 B1 | * | 3/2005 | Meyer | F02D 9/12 123/445 |

* cited by examiner

*Primary Examiner* — Jacob Amick
*Assistant Examiner* — Charles Brauch
(74) *Attorney, Agent, or Firm* — Quinn IP Law

(57) ABSTRACT

A fuel system includes a cooling fuel supply line that conveys a flow of cooling fuel from a storage tank to a mixing device. An upstream fuel return line conveys a flow of heated fuel to the mixing device from an internal combustion engine. The flow of the heated fuel from the upstream fuel return line mixes with the flow of cooling fuel from the cooling fuel supply line in the mixing device to form a flow of mixed fuel. A downstream fuel return line conveys the flow of mixed fuel from the mixing device to the storage tank. The mixing device includes a flow restrictor operable to generate a low pressure zone relative to a fluid pressure of the flow of cooling fuel in the cooling fuel return line that draws the flow of the cooling fuel through the cooling fuel supply line and into the mixing device.

19 Claims, 3 Drawing Sheets

FUEL COOLING SYSTEM

TECHNICAL FIELD

The disclosure relates to a fuel cooling system for a vehicle having a diesel engine.

BACKGROUND

Modern diesel engines include fuel systems that use a high pressure fuel pump to supply fuel to the fuel injectors. Fuel that is not used by the fuel injectors is circulated back to the fuel storage tank. Under some operating conditions, the fuel that is not used for combustion by the fuel injectors and is circulated back to the fuel storage tank may become heated during the circulation process. It is desirable to maintain the temperature of the fuel being circulated back to the fuel storage tank below a predetermined temperature. Accordingly, some vehicles are equipped with a cooling system for cooling the fuel being circulated back to the fuel storage tank.

SUMMARY

A fuel system is provided. The fuel system includes a storage tank, and a mixing device. A cooling fuel supply line is disposed in fluid communication with the mixing device and the storage tank. The cooling fuel supply line conveys a flow of cooling fuel from the storage tank to the mixing device. An upstream fuel return line is disposed in fluid communication with the mixing device. The upstream fuel return line conveys a flow of heated fuel to the mixing device. The flow of the heated fuel from the upstream fuel return line mixes with the flow of cooling fuel from the cooling fuel supply line in the mixing device to form a flow of mixed fuel. A downstream fuel return line is disposed in fluid communication with the mixing device and the storage tank. The downstream fuel return line conveys the flow of mixed fuel from the mixing device to the storage tank. The mixing device includes a lifting injector that is operable to generate a low pressure zone within the mixing device that draws the flow of the cooling fuel through the cooling fuel supply line and into the mixing device.

A vehicle is also provided. The vehicle includes a diesel engine having a high pressure fuel pump, and a plurality of fuel injectors. A high pressure fuel line interconnects the high pressure fuel pump and the plurality of fuel injectors. The vehicle further includes a fuel storage tank for storing fuel. A fuel feed line is disposed in fluid communication with the fuel storage tank and the high pressure fuel pump. The fuel feed line supplies fuel from the storage tank to the high pressure fuel pump. An upstream fuel return line is disposed in fluid communication with the high pressure fuel line. The upstream fuel return line receives heated fuel from the high pressure fuel line. A downstream fuel return line is disposed in fluid communication with the upstream fuel return line and the storage tank. The downstream fuel return line conveys fuel back to the storage tank. A mixing device interconnects the upstream fuel return line and the downstream fuel return line. A cooling fuel supply line is disposed in fluid communication with the mixing device and the storage tank. The cooling fuel supply line conveys a flow of fuel from the storage tank to the mixing device. The mixing device includes a flow restrictor that is operable to generate a low pressure zone in the mixing device relative to a fluid pressure in the cooling fuel supply line to draw fuel through the cooling fuel supply line and into the mixing device to mix with and cool the flow of heated fuel from the upstream fuel return line.

Accordingly, the mixing device mixes the flow of heated fuel from the internal combustion engine, with the flow of cooling fuel from the storage tank. If the temperature of the flow of heated fuel is greater than the temperature of the flow of cooling fuel, the cooling fuel will have a cooling effect, thereby reducing the temperature of the heated fuel prior to being returned to the fuel storage tank. The flow restrictor, e.g., a Venturi device, is used to generate the low pressure zone, relative to the fluid pressure of the cooling fluid in the cooling fuel supply line. The low pressure zone operates to draw the flow of the cooling fluid into the mixing device to mix with the flow of heated fuel.

The above features and advantages and other features and advantages of the present teachings are readily apparent from the following detailed description of the best modes for carrying out the teachings when taken in connection with the accompanying drawings.

DETAILED DESCRIPTION

Figure 1:
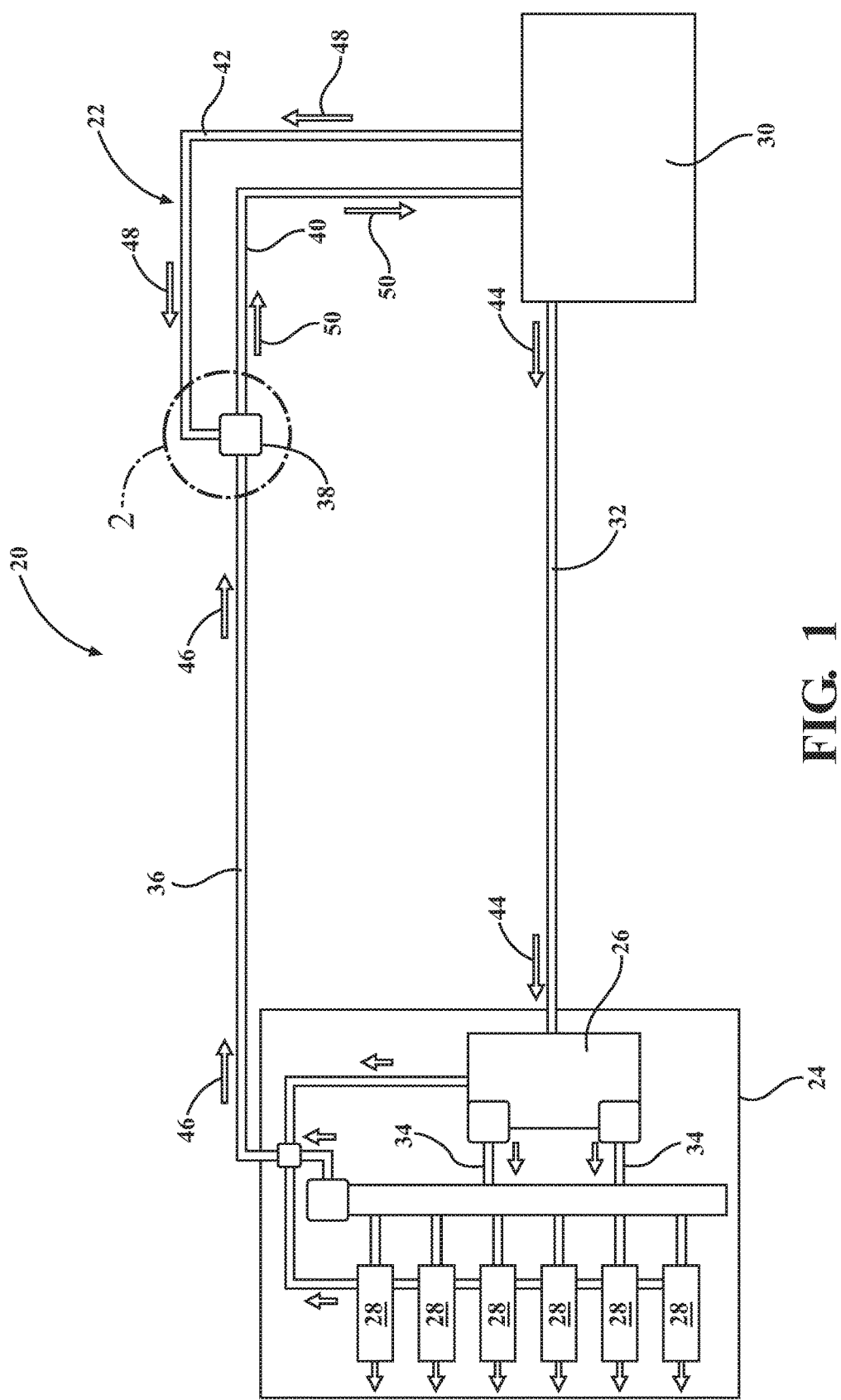
FIG. 1 is a schematic diagram of a first embodiment of a fuel system for a vehicle.

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

Referring to the Figures, wherein like numerals indicate like parts throughout the several views, a vehicle is generally shown at 20. The vehicle 20 may include any type, style, and/or configuration of vehicle 20 that includes a fuel system 22 for supplying an internal combustion engine 24 with a supply of combustion fuel. For example, the vehicle 20 may include, but is not limited to a car, a truck, a tractor, an ATV, a train, etc. Furthermore, while the exemplary embodiment of the fuel system 22 is described as being incorporated into the vehicle 20, it should be appreciated that the fuel system 22 may be incorporated into some other stationary device having an internal combustion engine 24, such as but not limited to a generator or power source. Accordingly, the fuel system 22 is not limited to use in the vehicle 20. In the exemplary embodiment described herein, the internal combustion engine 24 is described as a diesel engine that combusts diesel fuel. However, it should be appreciated that the fuel system 22 described herein may be used with other fuels for other engine types.

As noted above, the internal combustion engine 24 of the exemplary embodiment described herein is a diesel engine. The diesel engine 24 includes a high pressure fuel pump 26, which supplies a plurality of fuel injectors 28 with highly pressurized fuel. The specific operation of the engine 24, the high pressure fuel pump 26, and the fuel injectors 28 are not pertinent to the teachings of this disclosure, and are therefore not described in detail herein.

The fuel system 22 further includes a fuel storage tank 30, a fuel feed line 32, a high pressure fuel line 34, an upstream fuel return line 36, a mixing device 38, a downstream fuel return line 40, and a cooling fuel supply line 42. The fuel storage tank 30 stores a supply of fuel for use by the internal combustion engine 24. The specific size, shape, and/or construction of the fuel storage tank 30 are not pertinent to the teachings of this disclosure, and are therefore not described in detail herein. The fuel feed line 32 is disposed in fluid communication with the fuel storage tank 30 and the high pressure fuel pump 26. The fuel feed line 32 supplies fuel from the storage tank 30 to the high pressure fuel pump 26. The fuel flowing through the fuel feed line 32, between the fuel storage tank 30 and the high pressure fuel pump 26, may be referred to herein as the flow of engine supply fuel 44. The engine supply fuel is generally indicated by arrows 44 aligned parallel with the fuel feed line 32. The high pressure fuel pump 26 receives the flow of engine supply fuel 44, increases the fluid pressure of the flow of engine supply fuel 44, and directs the flow of engine supply fuel 44 to the high pressure fuel line 34. The high pressure fuel line 34 directs the flow of engine supply fuel 44 to the fuel injectors 28, as is known in the art.

As the fuel circulates from the fuel storage tank 30, through the fuel feed line 32, the high pressure fuel pump 26, and the high pressure fuel line 34, the fuel may absorb heat, and increase in temperature. Not all of the fuel circulated to and through the high pressure fuel pump 26 is consumed by the fuel injectors 28 during operation of the internal combustion engine 24. The portion of the flow of engine supply fuel 44 that is not used for combustion may be circulated back to the fuel storage tank 30. The upstream fuel return line 36 is disposed in fluid communication with the high pressure fuel line 34 for receiving the unused portion of the flow of engine supply fuel 44. The unused portion of the flow of engine supply fuel 44 may be referred to herein as the flow of heated fuel 46 from the high pressure fuel line 34. The heated fuel is generally indicated by arrows 46 aligned parallel with the upstream fuel return line 36. Accordingly, the unused portion of the flow of engine supply fuel 44 is the flow of heated fuel 46 flowing through the upstream fuel return line 36.

The mixing device 38 is disposed in fluid communication with the upstream fuel return line 36, and receives the flow of heated fuel 46 from the upstream fuel return line 36. The downstream fuel return line 40 is disposed in fluid communication with the mixing device 38 and the storage tank 30. Accordingly, the mixing device 38 is disposed in fluid communication with and interconnects the upstream fuel return line 36 and the downstream fuel return line 40. The cooling fuel supply line 42 is disposed in fluid communication with the mixing device 38 and the storage tank 30. The cooling fuel supply line 42 conveys a flow of cooling fuel 48 from the storage tank 30 to the mixing device 38. The cooling fuel is generally indicated by arrows 48 aligned parallel with the cooling fuel supply line 42. The mixing device 38 mixes the flow of the heated fuel 46 from the upstream fuel return line 36 and the flow of cooling fuel 48 from the cooling fuel supply line 42 to form a flow of mixed fuel 50. The downstream fuel return line 40 conveys the flow of mixed fuel 50 from the mixing device 38 back to the storage tank 30. The mixed fuel is generally indicated by arrows 50 aligned parallel with the downstream fuel return line 40.

The mixing device 38 includes what may be referred to as a lifting injector 51. As used herein, the term "lifting injector" is defined as a device that uses the Venturi effect of a flow restrictor, e.g., a converging section, to convert pressure energy of a motive fluid to velocity energy, which creates a low pressure zone 52 that draws in and entrains a suction fluid. As used herein, the term "Venturi effect" is described as the reduction in fluid pressure that results when a fluid flows through a constricted section of a pipe. Accordingly, the lifting injector 51 of the mixing device 38 is operable to generate a low pressure zone 52 in the mixing device 38, relative to a fluid pressure in the cooling fuel supply line 42, to draw fuel through the cooling fuel supply line 42 (i.e., the suction fluid) and into the mixing device 38 to mix with and cool the flow of heated fuel 46 from the upstream fuel return line 36. The lifting injector 51 may use the flow of heated fuel 46 from the upstream return line as the motive fluid, described as a first embodiment of the fuel system 22 and shown in FIGS. 1 and 2, or may alternatively use the flow of the engine supply fuel 44 from the fuel feed line 32 as the motive fluid, described as a second embodiment of the fuel system 22 and shown in FIGS. 3 and 4.

The lifting injector 51 includes a Venturi device, hereinafter referred to as a flow restrictor 54, which is disposed in fluid communication with a flow of motive fuel 56. The motive fuel is generally indicated by arrows 56. The flow restrictor 54 is used to induce the venture effect required to operate the lifting injector 51. The flow restrictor 54 is operable to restrict the flow of motive fuel 56, thereby increasing a velocity of the flow of motive fuel 56 and decreasing a fluid pressure of the flow of motive fuel 56. The increase in velocity and the decrease in fluid pressure of the motive fluid generates the low pressure zone 52 within the mixing device 38, which creates a suction effect in the cooling fuel supply line 42 that draws the flow of cooling fluid from the fuel storage tank 30, through the cooling fuel supply line 42, and into the mixing device 38.

The flow restrictor 54 may include, for example, a device, which includes an aperture 58 having a reduced diameter 60 relative to an upstream diameter 62 of the supply line conducting the flow of the motive fuel 56 to the lifting injector 51, e.g., the upstream fuel return line 36 or the fuel feed line 32. For example, the flow restrictor 54 may include but is not limited to, a plate defining the aperture 58. Alternatively, the flow restrictor 54 may include a converging section 64 that narrows in a direction of fluid flow through the lifting injector 51 to define the aperture 58. The direction of fluid flow through the lifting injector 51 is generally indicated by arrow 66, and is in the direction moving from the upstream fuel return line 36, to the downstream fuel return line 40, and back to the fuel storage tank 30. The converging section 64 includes a converging diameter 68 that decreases in size with movement in the direction of fluid flow through the lifting injector 51.

The lifting injector 51 may include a diverging section 70 as well, such as shown in the Figures. However, it should be appreciated that the lifting injector 51 is not required to include the diverging section 70. The diverging section 70 widens in the direction of fluid flow through the lifting injector 51. The downstream fuel return line 40 is disposed in fluid communication with the diverging section 70 of the lifting injector 51. The diverging section 70 includes a diverging diameter 72 that increases in size with movement in the direction of fluid flow through the lifting injector 51.

The flow of mixed fuel 50 enters the lifting injector 51 downstream of the flow restrictor 54. For example, and as shown in the Figures, the flow of mixed fuel 50 enters the lifting injector 51 between the converging section 64 and the diverging section 70.

Figure 2:
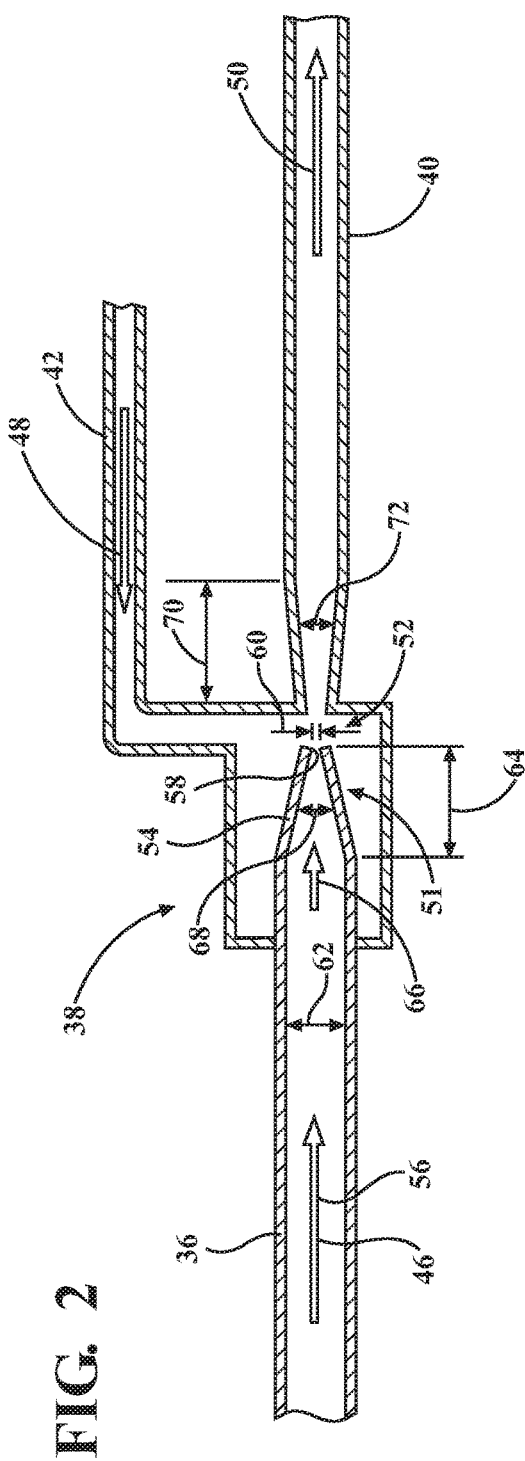
FIG. 2 is an enlarged schematic diagram of the first embodiment of the fuel system shown in FIG. 1.
Figure 4:
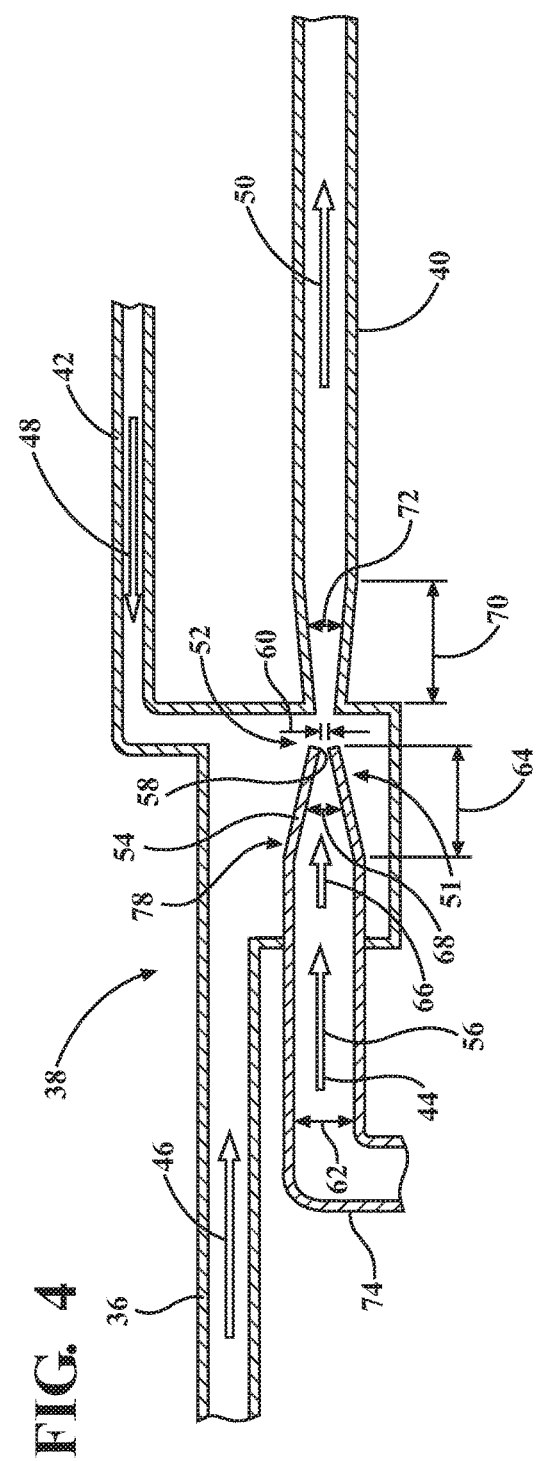
FIG. 4 is an enlarged schematic diagram of the second embodiment of the fuel system shown in FIG. 3.
Figure 3:
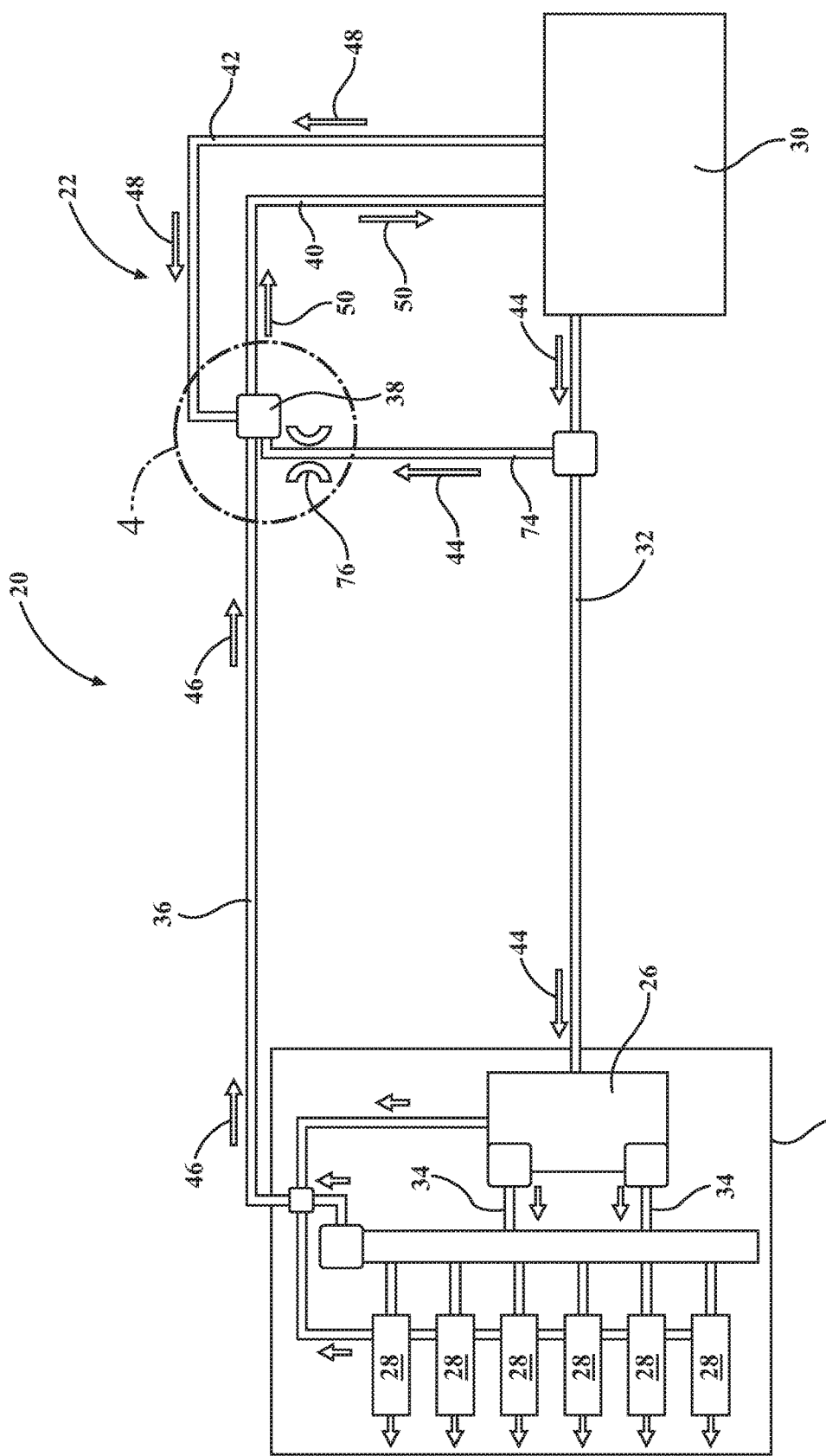
FIG. 3 is a schematic diagram of a second embodiment of a fuel system for the vehicle.

The above description of the fuel system 22 is applicable to both the first embodiment of the fuel system 22 shown in FIGS. 1 and 2, and the second embodiment of the fuel system 22 shown in FIGS. 3 and 4. Features common to both the first embodiment of the fuel system 22 and the second embodiment of the fuel system 22, which are described above, are identified throughout all of FIGS. 1 through 4 by their respective reference numerals.

Referring to FIGS. 1 and 2, the first embodiment of the fuel system 22 is described in greater detail. As noted above, the first embodiment of the fuel system 22 uses the flow of heated fuel 46 from the upstream fuel return line 36 as the flow of motive fuel 56 for the lifting injector 51. Accordingly, the flow restrictor 54, and more specifically, the converging section 64 of the lifting injector 51, is disposed in fluid communication with the upstream fuel return line 36 for receiving the flow of heated fuel 46 through the flow restrictor 54. The flow of heated fuel 46 from the upstream fuel return line 36 flows through the lifting injector 51, whereby the converging section 64 restricts the flow of heated fuel 46. The flow restrictor 54 in the lifting injector 51, e.g., the converging section 64 of the lifting injector 51 best shown in FIG. 2, restricts the flow of heated fuel 46 from the upstream fuel return line 36, which generates the low pressure zone 52 at or near the aperture 58 of the flow restrictor 54. The low pressure zone 52 includes a fluid pressure that is lower than a fluid pressure of the fuel in the cooling fuel supply line 42, which operates to draw fuel from the storage tank 30, through the cooling fuel supply line 42, and into the mixing device 38. The fuel from the cooling fuel supply line 42 is drawn into the diverging section 70 of the lifting injector 51, along with the flow of heated fuel 46 from the upstream fuel return line 36, to form the flow of mixed fuel 50 in the downstream fuel return line 40. If the fuel in the storage tank 30 is at a temperature that is less than the temperature of the flow of heated fuel 46 in the upstream fuel return line 36, the mixing of the flow of cooling fuel 48 with the flow of heated fuel 46 will decrease the temperature of the heated fuel 46, such that the flow of mixed fuel 50 includes a temperature that is less than the flow of heated fuel 46, but higher than the flow of cooling fuel 48.

Referring to FIGS. 3 and 4, the second embodiment of the fuel system 22 is described in greater detail. As noted above, the second embodiment of the fuel system 22 uses the flow of engine supply fuel 44 from the fuel feed line 32 as the flow of motive fuel 56 for the lifting injector 51. Accordingly, the flow restrictor 54, and more specifically, the converging section 64 of the lifting injector 51, is disposed in fluid communication with the fuel feed line 32 for receiving a portion of the flow of the engine supply fuel 44 through the flow restrictor 54. The fuel feed line 32 may include a branch line 74 for supplying the lifting injector 51.

The fuel system 22 may include a control valve 76 that is selectively operable to control fluid flow through the fuel feed line 32, to the mixing device 38. The control valve 76 is positioned in the branch line 74 so as to not interrupt fluid flow to the internal combustion engine 24. The control valve 76 may be actuated to regulate fluid flow through the lifting injector 51. For example, the control valve 76 may completely close fluid flow through the lifting injector 51, or may allow variable amounts of fluid flow through the lifting injector 51 to control the amount of suction generated within the mixing device 38. The control valve 76 may include any type and/or style of valve suitable for use in a fuel system 22. The control valve 76 may be controlled by a vehicle 20 controller, such as but not limited to an engine control module or other similar device.

The mixing device 38 includes a mixing chamber 78 that is disposed in fluid communication with the upstream fuel return line 36, the downstream fuel return line 40, and the cooling fuel supply line 42. The flow of heated fuel 46 is mixed with the flow of cooling fuel 48, within the mixing chamber 78, prior to being drawn into and discharged through downstream fuel return line 40. As noted above, the flow restrictor 54, and more specifically, the converging section 64 of the lifting injector 51, is disposed in fluid communication with the fuel feed line 32 via branch line 74 for receiving the flow of engine supply fuel 44 through the flow restrictor 54. The flow of engine supply fuel 44 from the fuel feed line 32 flows through the lifting injector 51, whereby the converging section 64 restricts the flow of heated fuel 46. The flow restrictor 54 in the lifting injector 51, e.g., the converging section 64 of the lifting injector 51 best shown in FIG. 4, restricts the flow of engine supply fuel 44 from the fuel feed line 32, which generates the low pressure zone 52 at or near the aperture 58 of the flow restrictor 54.

The low pressure zone 52 includes a fluid pressure that is lower than a fluid pressure of the cooling fuel 48 in the cooling fuel supply line 42, which draws fuel from the storage tank 30, through the cooling fuel supply line 42, and into the mixing chamber 78. The cooling fuel 48 mixes with the heated fuel 46 in the mixing chamber 78. The fuel from mixing chamber 78 is drawn into the diverging section 70 of the lifting injector 51, to form the flow of mixed fuel 50 in the downstream fuel return line 40. If the fuel in the storage tank 30 is at a temperature that is less than the temperature of the flow of heated fuel 46 in the upstream fuel return line 36, then the mixing of the flow of cooling fuel 48 with the flow of heated fuel 46 will decrease the temperature of the heated fuel 46, such that the flow of mixed fuel 50 includes a temperature that is less than the flow of heated fuel 46, but higher than the flow of cooling fuel 48.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

The invention claimed is:

1. A fuel system comprising:
a storage tank;
a mixing device;
a cooling fuel supply line in fluid communication with the mixing device and the storage tank for conveying a flow of cooling fuel from the storage tank to the mixing device;
an upstream fuel return line in fluid communication with the mixing device for conveying a flow of heated fuel to the mixing device;
wherein the flow of the heated fuel from the upstream fuel return line mixes with the flow of cooling fuel from the cooling fuel supply line in the mixing device to form a flow of mixed fuel;

a downstream fuel return line in fluid communication with the mixing device and the storage tank for conveying the flow of mixed fuel from the mixing device to the storage tank;

wherein the mixing device includes a lifting injector operable to generate a low pressure zone within the mixing device that draws the flow of cooling fuel through the cooling fuel supply line and into the mixing device;

wherein the lifting injector includes a flow restrictor in fluid communication with a flow of motive fuel, wherein the flow restrictor is operable to restrict the flow of motive fuel to increase a velocity and decrease a pressure of the flow of motive fuel to generate the low pressure zone within the mixing device;

wherein the flow restrictor includes a converging section that narrows in a direction of fluid flow through the lifting injector;

wherein the lifting injector includes a diverging section that widens in the direction of fluid flow through the lifting injector; and wherein the flow of mixed fuel enters the lifting injector between the converging section and the diverging section.

2. The fuel system set forth in claim 1, wherein the flow of motive fuel is the flow of heated fuel, and wherein the flow restrictor is in fluid communication with the upstream fuel return line for receiving the flow of heated fuel through the flow restrictor.

3. The fuel system set forth in claim 1, further comprising a fuel feed line in fluid communication with the storage tank and the mixing device for conveying a flow of engine supply fuel to the mixing device.

4. The fuel system set forth in claim 3, wherein the flow of motive fuel is the flow of engine supply fuel, and wherein the flow restrictor is in fluid communication with the fuel feed line for receiving the flow of engine supply fuel through the flow restrictor.

5. The fuel system set forth in claim 4, further comprising an internal combustion engine in fluid communication with the fuel feed line for receiving the flow of engine supply fuel.

6. The fuel system set forth in claim 5, wherein the upstream fuel return line is in fluid communication with the internal combustion engine, wherein an unused portion of the flow of engine supply fuel is the flow of heated fuel flowing through the upstream fuel return line.

7. The fuel system set forth in claim 6, wherein the internal combustion engine is a diesel engine, and the fuel is diesel fuel.

8. The fuel system set forth in claim 1, wherein the converging section includes a diameter that decreases in size with movement in the direction of fluid flow through the lifting injector.

9. The fuel system set forth in claim 1, wherein the diverging section includes a diameter that increases in size with movement in the direction of fluid flow through the lifting injector.

10. The fuel system set forth in claim 1, wherein the downstream fuel return line is in fluid communication with the diverging section of the lifting injector.

11. The fuel system set forth in claim 1, wherein the lifting injector includes a venturi device.

12. The fuel system set forth in claim 11, wherein the mixing device includes a mixing chamber in fluid communication with the upstream fuel return line, the downstream fuel return line, and the cooling fuel supply line, for mixing the flow of heated fuel with the flow of cooling fuel prior to being discharged through the downstream fuel return line.

13. The fuel system set forth in claim 5, further comprising a control valve selectively operable to control fluid flow through the fuel feed line, to the mixing device, without interrupting fluid flow to the internal combustion engine.

14. A fuel system comprising:
a storage tank;
a mixing device;
a cooling fuel supply line in fluid communication with the mixing device and the storage tank for conveying a flow of cooling fuel from the storage tank to the mixing device;
an upstream fuel return line in fluid communication with the mixing device for conveying a flow of heated fuel to the mixing device;
wherein the flow of the heated fuel from the upstream fuel return line mixes with the flow of cooling fuel from the cooling fuel supply line in the mixing device to form a flow of mixed fuel;
a downstream fuel return line having a diverging section disposed adjacent to the mixing device, with the downstream fuel return line disposed in fluid communication with the mixing device and the storage tank for conveying the flow of mixed fuel from the mixing device to the storage tank;
wherein the mixing device includes a lifting injector having a converging section in fluid communication with a flow of motive fuel and operable to generate a low pressure zone within the mixing device that draws the flow of cooling fuel through the cooling fuel supply line and into the mixing device; and
wherein the flow of mixed fuel enters the lifting injector between the converging section and the diverging section.

15. The fuel system set forth in claim 14, wherein the flow of motive fuel is the flow of heated fuel, and wherein the converging section is in fluid communication with the upstream fuel return line for receiving the flow of heated fuel.

16. The fuel system set forth in claim 14, further comprising a fuel feed line in fluid communication with the storage tank and the mixing device for conveying a flow of engine supply fuel to the mixing device.

17. The fuel system set forth in claim 16, wherein the flow of motive fuel is the flow of engine supply fuel, and wherein the converging section is in fluid communication with the fuel feed line for receiving the flow of engine supply fuel.

18. The fuel system set forth in claim 14, wherein the converging section includes a diameter that decreases in size with movement in the direction of fluid flow through the lifting injector.

19. The fuel system set forth in claim 14, wherein the diverging section includes a diameter that increases in size with movement in the direction of fluid flow through the lifting injector.

* * * * *